United States Patent [19]

Bellows

[11] 4,440,154
[45] Apr. 3, 1984

[54] SOLAR ENERGY COLLECTING APPARATUS

[75] Inventor: Alfred H. Bellows, Wayland, Mass.

[73] Assignee: GTE Laboratories Incorporated, Waltham, Mass.

[21] Appl. No.: 392,109

[22] Filed: Jun. 25, 1982

[51] Int. Cl.³ .................................................. F24J 3/02
[52] U.S. Cl. ..................................... 126/438; 126/443; 138/108; 138/112; 138/113
[58] Field of Search ............... 126/438, 439, 442, 443; 138/112–114, 148, 108; 174/28; 350/293

[56] References Cited

U.S. PATENT DOCUMENTS

| | | | |
|---|---|---|---|
| 1,068,650 | 7/1913 | Harrison | 126/442 |
| 2,915,089 | 12/1959 | Horsting, Sr. | 138/113 |
| 3,227,153 | 1/1966 | Godel et al. | 126/438 |
| 3,959,056 | 5/1976 | Caplan | 126/438 |
| 3,983,861 | 10/1976 | Beauchaine | 126/442 |
| 4,067,315 | 1/1978 | Fehlner et al. | 126/433 |
| 4,083,360 | 4/1978 | Courvoisler et al. | 126/447 |
| 4,091,796 | 5/1978 | Bieringer et al. | 126/438 |
| 4,120,284 | 10/1978 | Cotsworth et al. | 126/447 |
| 4,122,832 | 10/1978 | Hirschsohn et al. | 126/442 |
| 4,133,298 | 1/1979 | Hayama | 126/438 |
| 4,149,521 | 4/1979 | Miller et al. | 126/425 |
| 4,175,541 | 11/1979 | Midgley | 126/429 |
| 4,192,292 | 3/1980 | Root | 126/448 |
| 4,198,955 | 4/1980 | Dorbeck | 126/439 |
| 4,215,674 | 8/1980 | Riggs et al. | 126/438 |
| 4,307,711 | 12/1981 | Doundoulakis | 126/442 |

FOREIGN PATENT DOCUMENTS 2640060 3/1978 Fed. Rep. of Germany ...... 126/443

*Primary Examiner*—Lee E. Barrett
*Attorney, Agent, or Firm*—David M. Keay

[57] ABSTRACT

A non-tracking elongated evacuated tube solar energy collector employing compound parabolic reflectors. An energy absorber is positioned at the focal points of the parabolas and is supported by one or more support members along its length. Each support member is a length of resilient wire in the form of a coil encircling the energy absorber with arms extending from each side of the coil. Each arm bears against the inner walls of the evacuated tube at two spaced-apart contact regions.

3 Claims, 7 Drawing Figures

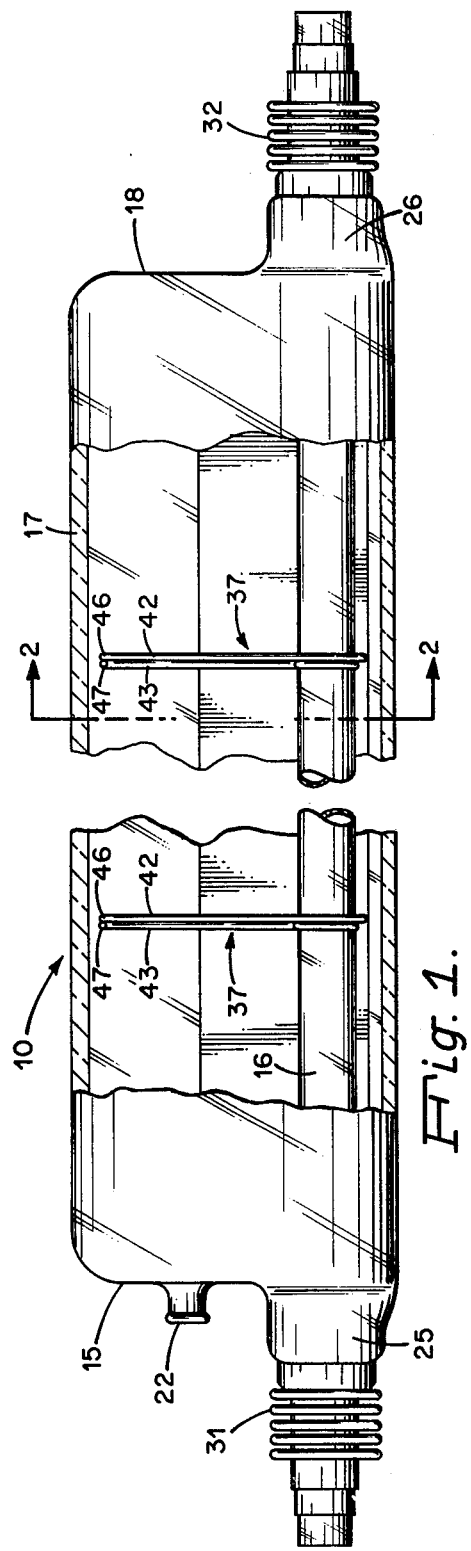
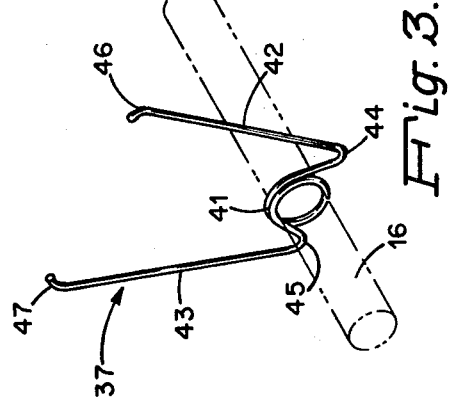
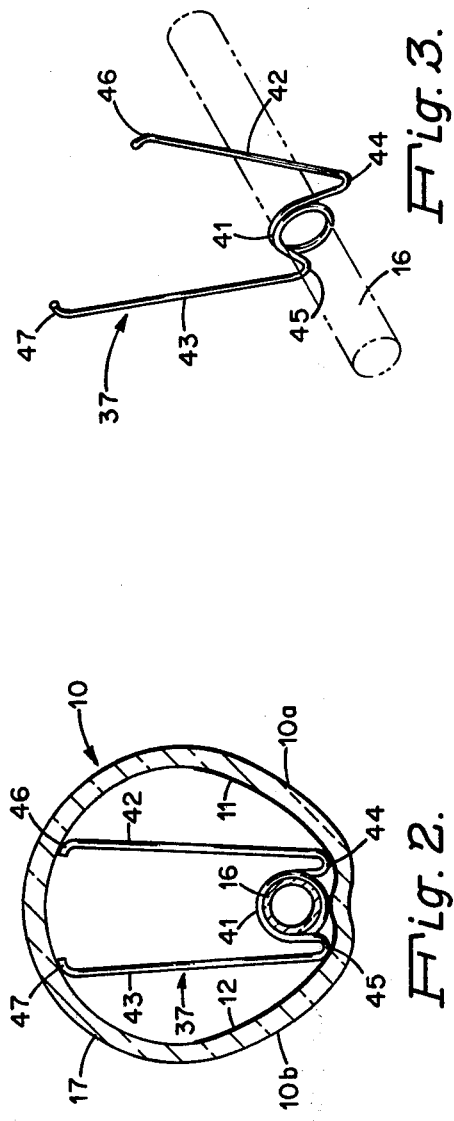

SOLAR ENERGY COLLECTING APPARATUS

BACKGROUND OF THE INVENTION

This invention relates to solar energy collecting apparatus. More particularly it is concerned with elongated evacuated tube solar energy collectors.

Among the developments in the art of solar energy apparatus are evacuated tube collectors which employ an evacuated glass tube surrounding an energy absorber. Vacuum insulation prevents conduction and convection losses from the energy absorber thus allowing higher operating temperatures and improving efficiency. Recent developments in elongated solar energy reflecting and concentrating structures, specifically structures of compound parabolic configuration, have contributed to improvements in non-tracking collectors of high efficiency. An improved non-tracking elongated evacuated tube solar energy collector employing compound parabolic reflectors and a straight-through fluid flow heat transfer construction is described and claimed in copending application Ser. No. 334,605 filed Dec. 28, 1981 by Sandford C. Peek and assigned to the assignee of the present application.

In solar energy collecting apparatus of the general type as described the energy absorber should be located at its proper position at the focus of the reflected insolation in order to obtain high efficiency. To provide proper positioning of the energy absorber throughout the rather long span in an elongated evacuated collector at the operating temperature produced, the energy absorber must be supported at intermediate points along its length in addition to being supported at the ends of the evacuated tube. Energy absorber supporting devices heretofore available were complicated, employed several parts, required structure for attachment to the tube, blocked insolation impinging on the energy absorber, and/or provided a significant path for thermal losses from the energy absorber.

SUMMARY OF THE INVENTION

Solar energy collecting apparatus in accordance with the present invention includes improved locating means for supporting the energy absorber in position. The apparatus comprises an elongated sealed envelope having side walls which extend longitudinally parallel to the principal axis of the envelope. An elongated energy absorber is disposed within the envelope parallel to the principal axis. The envelope includes a longitudinally extending radiant energy entrance aperture for permitting the passage of radiant energy into the interior of the envelope. Reflective surfaces extend longitudinally within the envelope to accept radiant energy passing through the entrance aperture and to reflect the radiant energy so as to impinge on the energy absorber. The apparatus also includes locating means for supporting the energy absorber in position in the envelope. The locating means includes a support member which has a coil closely encircling the energy absorber. A first arm of the support member extends from the coil and bears against the inner surfaces of the side walls of the envelope at first and second spaced apart contact regions. A second arm extends from the coil and bears against the inner surfaces of the side walls of the envelope at third and fourth spaced apart contact regions.

BRIEF DESCRIPTION OF THE DRAWINGS

In the drawings:

FIG. 1 is an elevational view partially in cross-section illustrating a solar energy collecting apparatus in accordance with the present invention;

FIG. 2 is a cross-sectional view of the apparatus of FIG. 1 taken along the line 2—2 of FIG. 1;

FIG. 3 is a perspective view of a support member for supporting the energy absorber in the apparatus of FIGS. 1 and 2 prior to assembly within the envelope.

Figure 4:
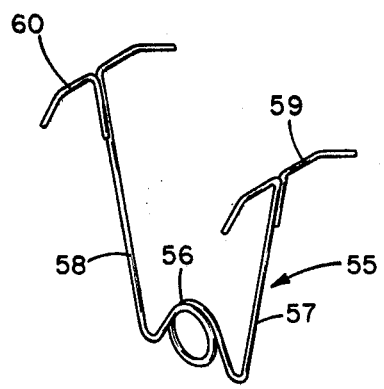
FIGS. 4, 5, 6, and 7 are perspective views of various modifications of the support member of FIGS. 1, 2, and 3.

For a better understanding of the present invention, together with other and further objects, advantages, and capabilities thereof, reference is made to the following discussion and appended claims in connection with the above-described drawings.

DETAILED DESCRIPTION OF THE INVENTION

Solar energy collecting apparatus in accordance with the present invention is illustrated in FIGS. 1 and 2. The apparatus includes an elongated tubular envelope 10 of a material which is transparent to solar radiant energy, specifically borosilicate glass. The envelope 10 is of generally circular cross-section, as shown in FIG. 2, with the lower portions 10a and 10b of the side walls formed into a compound parabolic contour. The interior surfaces of the lower portions 10a and 10b of the side walls which are of parabolic configuration are coated with a reflective material which may, for example, be vacuum deposited aluminum or silver to form parabolic reflectors or reflective surfaces 11 and 12. The elongated envelope 10 is terminated by end walls 15 and 18 having openings which are encircled by cylindrical extensions 25 and 26. An exhaust tubulation 22 is included in the first end wall 15.

An energy absorber 16 which is in the form of an elongated hollow tube element of circular cross-section is disposed within the envelope in the region of the focal points of the two parabolas of the reflective surfaces 11 and 12. Thus, solar radiant energy entering the envelope 10 through the entrance aperture 17 provided by the uncoated transparent upper portion of the envelope 10 is reflected by the parabolic reflective surfaces 11 and 12 to impinge on the energy absorber 16. The energy absorber 16 has a high absorptivity-emissivity ratio; that is, it is an efficient absorber of insolation and a poor emitter at the operating temperature of the energy absorber, about 250° C. Specifically, the energy absorber may be a stainless steel tube coated with successive layers of aluminum, silicon oxide, chromium oxide, and silicon oxide to provide a coating having the desired characteristics. A suitable fluid such as a high temperature silicone liquid is passed through the hollow tube of the energy absorber to transfer the collected heat energy to utilization apparatus.

The energy absorber 16 extends longitudinally along the length of the envelope 10 parallel to its principal axis. It extends to the exterior of the envelope through the cylindrical extensions 25 and 26 in the end walls 15 and 18, respectively, and is sealed to the cylindrical extensions by flexible bellows 31 and 32, respectively. The arrangement of sealing the energy absorber 16 by way of the bellows 31 and 32 to the envelope 10 is described in detail in the aforementioned application of Sandford C. Peek. The chamber within the envelope is exhausted through the exhaust tubulation 22 which is subsequently sealed off.

In addition to being supported at the extremities of the envelope by the bellows arrangements 31 and 32, the energy absorber 16 is supported at one or more points along its length by support members or clips 37. The support member 37 can best be seen in the cross-sectional view of FIG. 2 taken transverse to the principal axis of the envelope and in the perspective view of FIG. 3. FIG. 3 shows the support member 37 prior to assembly within the envelope with the energy absorber 16 illustrated in phantom.

The support member 37 is fabricated of a length of flexible metal wire of uniform diameter. The support member includes a coil 41 of about one and one-half turns and, when in a relaxed state, of internal diameter slightly less than the outside diameter of the energy absorber 16. Thus, when the coil is installed over the energy absorber 16, it grips the energy absorber firmly. A first arm 42 extends from one side of the coil 41 and includes a reverse bend portion 44 adjoining the coil. Similarly, a second arm 43 extends from the opposite side of the coil and includes a reverse bend portion 45 adjoining the coil. Each of the arms 42 and 43 is generally straight along the major portion of its length between the reverse bend portion at one end and the free end at the other end. The free ends 46 and 47 are so shaped that their sharp edges do not directly contact the envelope where they might scratch or induce stresses in the glass.

The height of the coil 41 above the outer surfaces of the reverse bend portions 44 and 45 and the distance between the lowermost points of the reverse bend portions 44 and 45 are selected so as to locate the energy absorber 16 at the focus of the reflective surfaces 11 and 12. The reverse bend portions 44 and 45 are resilient and tend to bias the arms 42 and 43 away from each other as illustrated in FIG. 3. When the support member is in place within the envelope 10, the arms 42 and 43 are urged outwardly, forcing their free ends 46 and 47 to bear against the inner surfaces of the side walls of the envelope 10 at contact regions at the entrance aperture 17. The free ends 46 and 47 grip the tube envelope firmly and also tend to urge the outer surfaces of the reverse bend portions 44 and 45 against contact regions on the reflective surfaces 11 and 12, respectively. Each support member 37, as well as the cross-section of the envelope 10, is substantially symmetrical about the vertical plane defined by the principal axis of the envelope and the central axis of the energy absorber 16.

As can be seen in FIG. 2 the outer surfaces of the reverse bend portions 44 and 45 are tangent to the reflective surfaces 11 and 12 near the low points of the parabolas, but on the outwardly rising side walls from the low points. The low point of a parabola is the best defined datum for fixing the focal points. Manufacturing variations in either of the parabolas formed by the side walls 10a and 10b or in the support member 37 may shift the tangent points symmetrically inwardly or outwardly. Since the tangent points are nearly horizontal, such shifting will have little effect on the vertical position of the energy absorber 16. Furthermore, slight manufacturing errors in the diameter of the energy absorber 16 or the coil 41 produces more or less winding of the coil 41, which is a spring. As a consequence the reverse bend portions 44 and 45 are shifted, not horizontally, but along an arc about the center of the energy absorber 16. Thus, the location of the outer surfaces of the reverse bend portions 44 and 45 on the outwardly rising surfaces of the parabolas provides a satisfactory compromise for minimizing any adverse effects of the foregoing errors.

The support members 37 are placed within the envelope by first being positioned in the proper location along the length of the energy absorber 16 prior to its being assembled in the envelope 10. The first and second arms 42 and 43 are urged toward each other from their relaxed state as illustrated in FIG. 3 by a suitable tool or fixture. After the energy absorber 16 and attached support members 37 are positioned within the envelope 10, the arms 42 and 43 are released. The arms are biased apart and each support member 37 assumes its position as shown in FIG. 2 supporting the energy absorber 16 at the focus of the reflective surfaces 11 and 12. Assembly of the envelope 10 and energy absorber 16 with the other parts of the apparatus is then completed.

FIG. 4 is a perspective view of one modification of a support member in accordance with the present invention. FIG. 4 shows the support member 55 in its relaxed position outside the envelope. The support member 55 includes a coil 56 and first and second arms 57 and 58 having reverse bend portions adjoining the coil as in the embodiment illustrated in FIGS. 1—3. The free ends of the arms 57 and 58, however, have portions 59 and 60 which extend parallel to the principal axis of the envelope along both directions from the arms 57 and 58, respectively. These portions 59 and 60 bear against the envelope to provide elongated contact regions at the side walls at the entrance aperture of the envelope. Additional stability is thus provided for the support member virtually eliminating any tendency for twisting or shifting of the arms from the position they assume when in position in the envelope.

Figure 5:
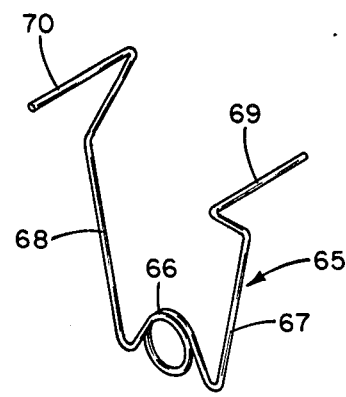

Another modification of the support member is illustrated in FIG. 5. The support member 65 also includes a coil 66 and arms 67 and 68 which extend in substantially straight lines from reverse bend portions and lie in a single plane transverse to the principal axis of the envelope. Near their free ends the arms 67 and 68 are bent to provide two laterally extending portions 69 and 70 which function in a manner similar to the portions 59 and 60 of the support member 55 illustrated in FIG. 4 to provide additional stability.

Figure 6:
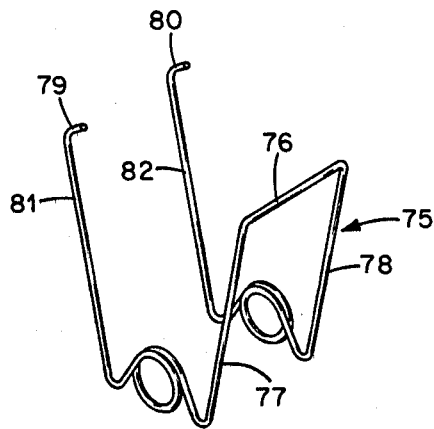

The support member 75 of FIG. 6 is a still further modification in which essentially two support members are fabricated from a single length of flexible resilient wire. A section 76 extending parallel to the principal axis of the envelope connects corresponding arms 77 and 78 of the individual members. When the support member 75 is in position, the free ends 79 and 80 of arms 81 and 82 provide spaced-apart contact regions along one side of the envelope and the section 76 provides an elongated contact region along the other side. This arrangement thus provides very stable support for the support members themselves and also for the energy absorber.

Figure 7:
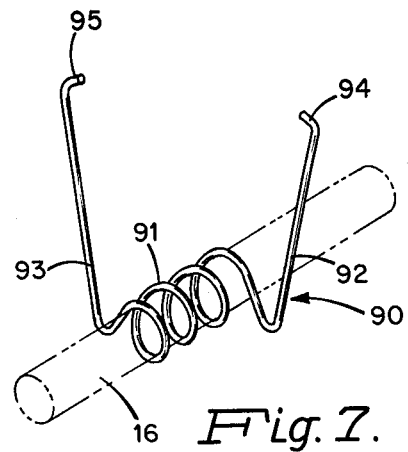

FIG. 7 illustrates yet another modification of the support member in accordance with the present invention. The support member 90 has a coil 91 of several turns which are spaced-apart along the direction of the principal axis of the envelope so as to grip the energy absorber 16, as shown in phantom, along a portion of its length. A first arm 92 extends from one end of the coil and a second arm 93 extends from the opposite end of the coil. Thus arms 92 and 93 are spaced apart along the length of the envelope in separate transverse planes. Their free ends 94 and 95, respectively, bear against opposite sides of the envelope at contact regions which are spaced apart along the length of the envelope thus providing additional stability for the support member 90 and the energy absorber.

Support members as illustrated are simple, inexpensive components for properly locating and supporting an energy absorber at the focal point within the envelope of an evacuated tube solar energy collector. They are tolerant of errors in manufacturing and permit ease of assembly. Their small diameter and the small surface areas of the contact with the energy absorber and with the envelope together with the lengths of their arms provide very poor conductive paths for leaking energy away from the energy absorber. In addition, the thin wire structure provides little interference to the insolation passing through the energy aperture and reflecting off the reflective surfaces onto the energy absorber.

While there has been shown and described what are considered preferred embodiments of the present invention, it will be obvious to those skilled in the art that various changes and modifications may be made herein without departing from the invention as defined by the appended claims.

What is claimed is:

1. Solar energy collecting apparatus comprising an elongated sealed envelope having side walls extending longitudinally parallel to the principal axis of the envelope;

an elongated energy absorber disposed within said envelope parallel to said principal axis;

a longitudinally extending radiant energy entrance aperture in said envelope for permitting the passage of radiant energy therethrough into said envelope;

reflective surfaces extending longitudinally within said envelope for accepting radiant energy passing through said entrance aperture and reflecting it so as to impinge on said energy absorber;

said reflective surfaces being formed by a reflective coating on the inner surfaces of portions of the side walls of the envelope, and said reflective surfaces having a compound parabolic contour in a plane transverse to said principal axis;

locating means for supporting the energy absorber within the envelope substantially at the focus of the parabolas including a resilient support member of thin wire of uniform diameter;

the support member having a coil closely encircling said energy absorber the internal diameter of the coil in a relaxed state tending to be smaller than the external diameter of the energy absorber, a first arm extending from the coil and bearing against the inner surfaces of the side walls of the envelope at first and second spaced apart contact regions, and a second arm extending from the coil and bearing against the inner surfaces of the side walls of the envelope at third and fourth spaced apart contact regions;

said first arm of said support member including a first reverse bend portion at one end thereof adjoining said coil at one side thereof; and said second arm of said support member includes a second reverse bend portion at one end thereof adjoining said coil at the opposite side thereof;

the outer surface of said first reverse bend portion bearing against the inner surface of the side walls of the envelope at said first contact region;

the outer surface of said second reverse bend portion bearing against the inner surface of the side walls of the envelope at said third contact region;

said outer surfaces of the first and second reverse bend portions bearing against the first and third contact regions, respectively, at said reflective surfaces adjacent to the low points of the parabolas;

said first arm being generally straight along the major portions of its length from said reverse bend portion at said one end to the other end thereof;

said second arm being generally straight along the major portion of its length from said reverse bend portion at said one end to the other end thereof, said other ends of said first and second arms being biased apart thereby urging said other ends of the first and second arms against the inner surfaces of the side walls of the envelope at said second and fourth contact regions, respectively, at said radiant energy entrance aperture and urging said outer surfaces of said first and second reverse bend portion against said first and third contact regions, respectively, at said reflective surfaces.

2. Solar energy collecting apparatus in accordance with claim 1 wherein said other ends of said first and second arms include portions extending parallel to said principal axis and bearing against the inner surfaces of the side walls of the envelope at elongated second and fourth contact regions, respectively.

3. Solar energy collecting apparatus in accordance with claim 1 wherein said coil includes several turns of wire distributed along a portion of the length of the energy absorber in a direction parallel to said principal axis; and said first and second arms lie in separate spaced-apart planes transverse to the principal axis.

* * * * *